United States Patent

O'Donnell et al.

[11] Patent Number: 5,917,642
[45] Date of Patent: Jun. 29, 1999

[54] OPTICAL MODULATOR

[75] Inventors: Adrian Charles O'Donnell, Chelmsford; Pisu Jiang, Witham, both of United Kingdom

[73] Assignee: Integrated Optical Components Limited, Witham, United Kingdom

[21] Appl. No.: 09/104,066

[22] Filed: Jun. 24, 1998

Related U.S. Application Data

[63] Continuation of application No. 08/718,749, Sep. 23, 1996, abandoned.

[51] Int. Cl.$^6$ ....................................................... G02F 1/03
[52] U.S. Cl. ................................................................. 359/245
[58] Field of Search ................................... 359/188, 245, 359/254; 385/3

[56] References Cited

U.S. PATENT DOCUMENTS

| | | | |
|---|---|---|---|
| 4,763,974 | 8/1988 | Thaniyavarn | 385/3 |
| 5,249,243 | 9/1993 | Skeie | 385/3 |
| 5,303,079 | 4/1994 | Gnauck et al. | 359/188 |
| 5,309,532 | 5/1994 | Chang et al. | 385/3 |
| 5,467,414 | 11/1995 | Birkmayer et al. | 385/3 |

*Primary Examiner*—Georgia Epps
*Assistant Examiner*—Ricky Mack
*Attorney, Agent, or Firm*—McGlew and Tuttle, P.C.

[57] ABSTRACT

An optical modulator for duobinary modulation is based on a Mach-Zehnder interferometer but has parallel optical waveguides of a greater length than normally is employed with an optical modulator. A pair of similar electrode structures are arranged in series on the waveguides, the electrodes of the two structures being separately addressable by binary electrical signals. The phase shifts induced in the light propagating along the parallel waveguides by voltages applied to the separate electrode structures allows the output to take values of 0, 1 or 2 for binary inputs applied to the structures.

10 Claims, 3 Drawing Sheets

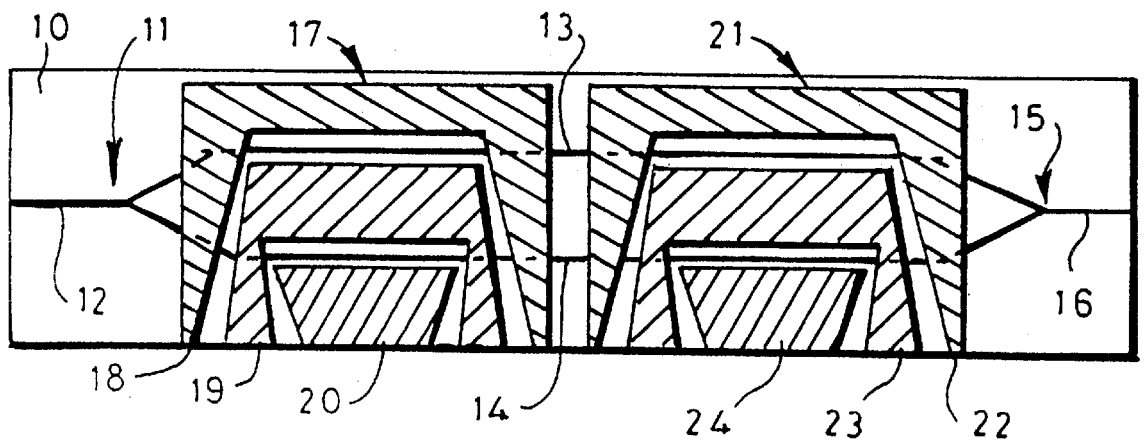
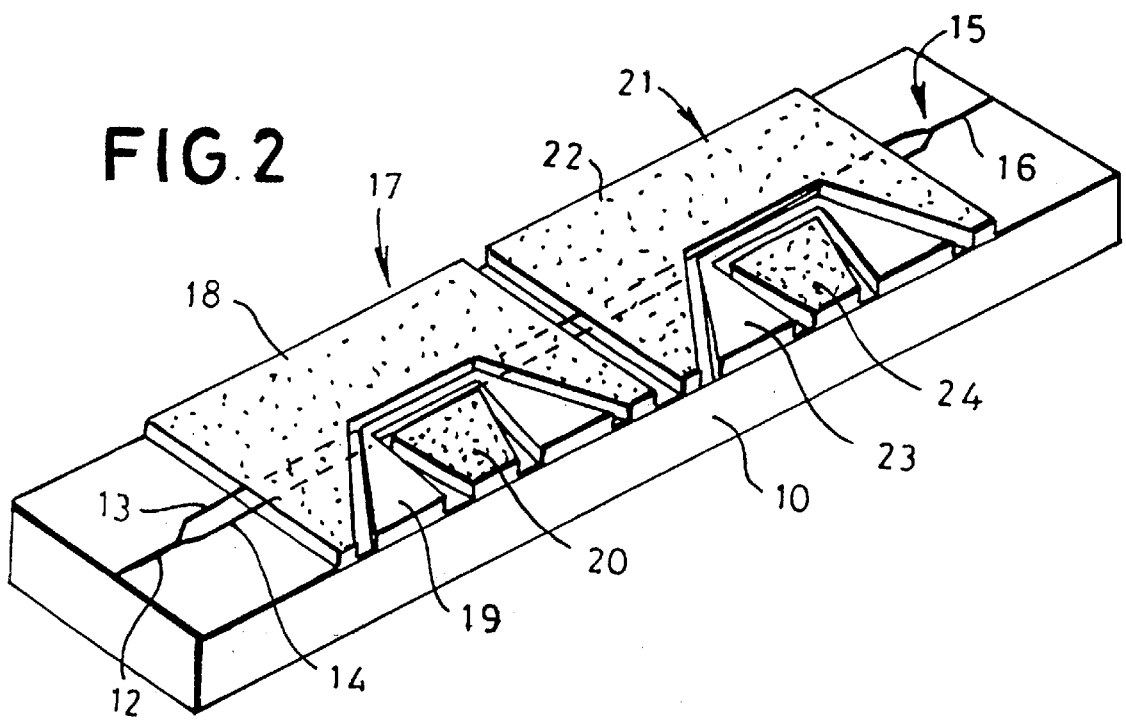

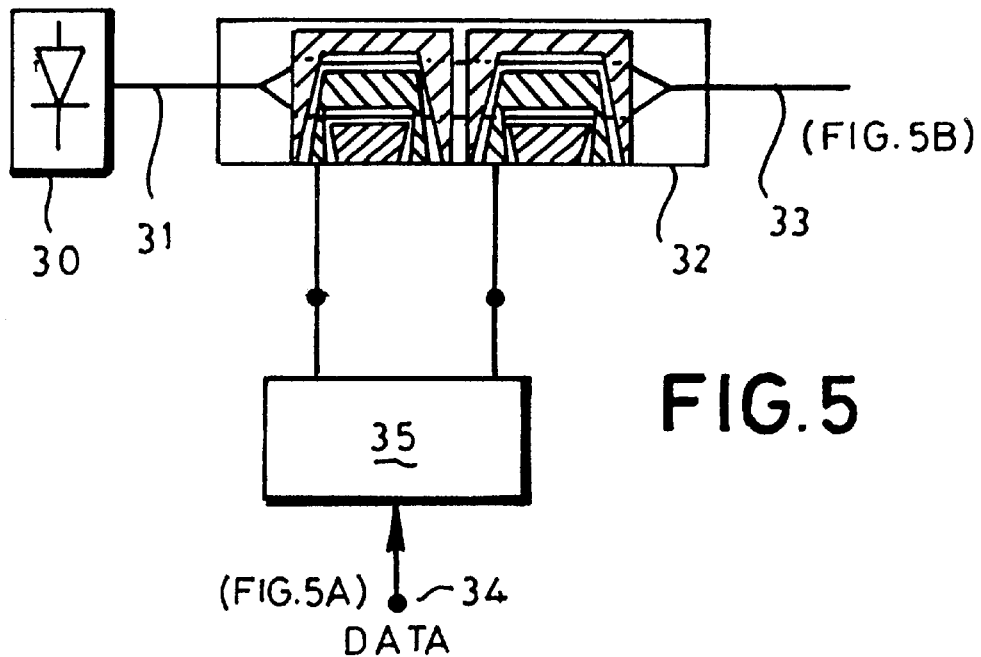
FIG.5
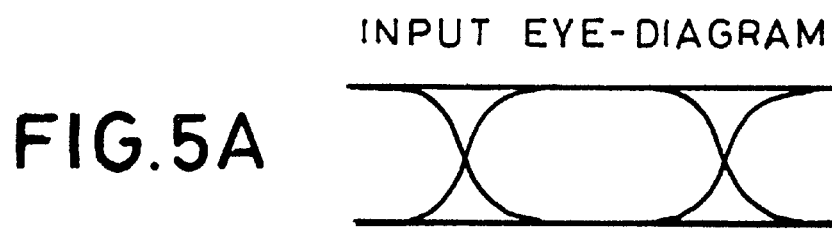
FIG.5A  INPUT EYE-DIAGRAM
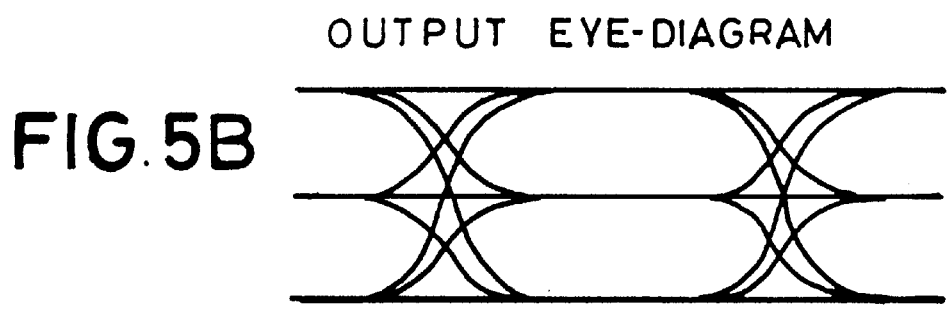
FIG.5B  OUTPUT EYE-DIAGRAM

OPTICAL MODULATOR

This application is a continuation of Ser. No. 08/718,749, filed Sep. 23, 1996, now abandoned.

BACKGROUND OF THE INVENTION

1. Field of the Invention

This invention relates to an integrated optical modulator for producing a duobinary modulated optical signal, and also to a modulator system using such a modulator. The invention further relates to a modulating method, for producing a duobinary modulated optical signal.

2. Description of the Prior Art

The ever increasing demand for telecommunication systems has led to the development of optical high bandwidth transmission systems, having multi-gigabit data rates. As the bandwidth of a telecommunication system increases, previously unimportant system factors are becoming critical to the successful operation of the system.

One factor which has become critical is the chromatic dispersion of an optical data signal, where the broadening of the digital pulses as the signal is propagated through the transmission system degrades the system performance and causes increased bit-error rates. Since chromatic dispersion is essentially a function of the propagation velocity of light in a fibre and the wavelength of that light, signals with a broader optical spectrum will be more severely corrupted by inter-symbol interference effects than signals with a narrower spectral content. The broadening of the optical spectral content of a given signal is usually referred to as the "chirp" of the signal.

The use of dc biased narrow linewidth laser sources in conjunction with zero-chirp external modulators has resulted in the information bandwidth itself being the limiting and controlling factor of the spectral content of a signal, and hence the severity of the inter-symbol interference at a receiver. If all other parameters remain constant for such a system, a reduction in transmission bandwidth should result in a reduction of the chromatic dispersion penalty for the system.

The use of so-called duobinary codes is one way of reducing the information bandwidth, since a duobinary coded signal has half the transmission bandwidth of a binary signal. A duobinary coded signal is in fact a ternary signal having three levels—that is, off, half-on and on. Such a transmission system may also use some degree of controlled inter-symbol interference, to introduce correlation into the signal.

In U.S. Pat. No. 5,303,079 there is described a modulator which is configured to allow the chirp of a signal to be adjusted and controlled, but that modulator can be used to provide duobinary modulation. This is because the modulator has two electrodes, one on each arm respectively of the modulator, and which electrodes can be driven separately by a duobinary driver circuit.

SUMMARY OF THE INVENTION

The present invention aims at providing both a duobinary modulator and a method of modulating an optical signal so as to be coded in a duobinary manner, using integrated optical techniques specifically adapted for this purpose. Such a modulator may operate with fixed chirp and so allow the performance of a data transmission system to be improved.

According to one aspect of the present invention, there is provided an integrated optical modulator for producing a duobinary modulated optical signal from binary drive signals, comprising a substrate in which is formed an optical waveguide, the waveguide being divided into two arms which then merge into a single output waveguide whereby incoming light divides to be propagated along both arms and on being recombined interference may occur. The modulator has a first modulator electrode structure arranged with respect to the two arms over a first part thereof, and a second substantially similar modulator electrode structure arranged with respect to the two arms over a second part thereof. The first and second electrode structures are arranged serially along the arms and each has substantially the same optical path length, each electrode structure having separately addressable electrodes each by appropriate binary drive signals.

According to a second aspect of this invention there is provided modulating method to produce a duobinary modulated optical signal using an integrated optical modulator having a substrate in which is formed an optical waveguide which divides into two arms and which arms then merge into a single output waveguide. The modulator has a first and second separate and substantially similar modulator electrode structures arranged serially with respect to the two arms and having separately addressable electrodes. In performing the method, an optical wave is fed into the waveguide and is divided into two portions respectively propagated along the two arms and then is recombined into the output waveguide, and separate binary drive signals are supplied to the two electrode structures respectively whereby on recombination of the optical wave portions, interference therebetween may take place so as to produce a duobinary modulated optical signal.

BRIEF DESCRIPTION OF THE DRAWINGS

In order that the invention may better be understood, it will now be described in greater detail and certain specific embodiments thereof will be given, though only by way of example. In the drawings:

FIG. 1 schematically illustrates a duobinary modulator arrange in accordance with this invention;

FIG. 2 is a diagrammatic isometric view of a practical embodiment of the modulator of FIG. 1;

FIG. 5 diagrammatically illustrates a duobinary modulation system FIGS. 5A & 5B are input and output eye diagrams for the system of FIG. 5.

DESCRIPTION OF THE PREFERRED ARRANGEMENTS

Figure 3:
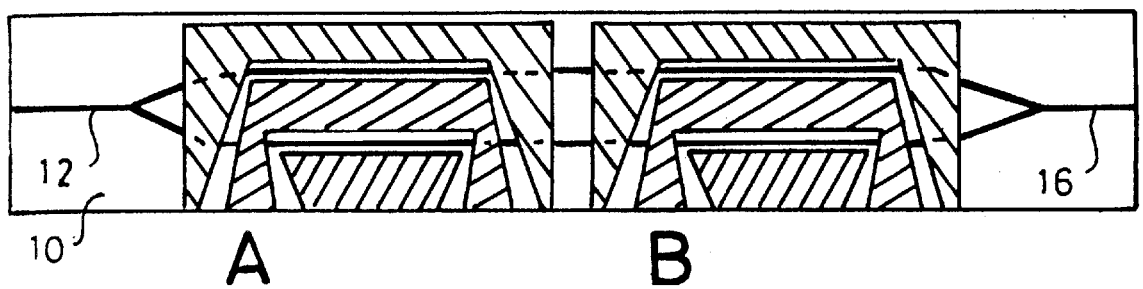
FIGS. 3 and 4 diagrammatically illustrate duobinary modulation of an optical signal using the modulator of FIG. 1.

The preferred form of modulator of this invention is based on a standard Mach-Zehnder modulator, in which an input optical waveguide is split by a structure such as a Y-junction into two essentially parallel waveguide arms. These are subsequently recombined by another Y-junction or similar structure, such that the output optical intensity is determined by the relative phases of the optical intensities in the two arms. The modulator may have dual complementary outputs, in which case the recombining Y-junction may be replaced by an X-junction (i.e. a cross-over structure) or a directional coupler.

The optical signal leaving the modulator is encoded with electronic information (data) by shifting the relative phases of the light propagating along the two arms of the modulator.

This is achieved by providing electrode structures along the two arms. In the preferred embodiment, two separate electrode structures are arranged on the two parallel arms, sequentially then along. The electrode structures may be slightly different from each other and, in order to achieve a defined chirp performance, may have a different geometry with respect to each waveguide arm in terms of electrode gap, position of each electrode with respect to the waveguide arms, and so on.

The integrated optical modulator shown in FIG. 1 is based on a Mach-Zehnder interferometer and comprises a substrate 10 for example of lithium niobate in which is formed an optical waveguide 11. That waveguide is produced for example by well known and understood infusion techniques with a material such as titanium, in order to change the refractive index of the substrate. The optical waveguide 11 has a first part 12 which is then divided into two arms 13 and 14 which extend parallel to one another within the substrate, and then are recombined at 15 to form an output waveguide 16. The manufacture of such a waveguide forms no part of the present invention and will not be discussed in further detail here.

In the modulator of FIG. 1, the arms 13 and 14 are somewhat longer than the arms of a conventional integrated optical modulator operating on the usual Mach-Zehnder principle and typically slightly more than twice the conventional length for a modulator operating on a specified wavelength. The modulator is provided with a first modulator section 17, having an essentially conventional arrangement of electrodes 18, 19 and 20, formed on the substrate 10 again in a manner well known and understood in the art. The modulator further has a second modulator section 21, of substantially the same arrangement of electrodes 22, 23 and 24 as is the first modulator section 17. As will be appreciated, the second modulator section 21 is arranged serially with respect to the first modulator section 17.

The electrodes of the first modulator section 17 and of the second modulator section 21 are separately addressable, by connections taken from the respective electrodes to terminals external of the modulator package.

FIG. 2 illustrates a practical embodiment of the modulator of FIG. 1, intended for use at 20 Gb/s or higher. This embodiment was produced on a substrate 10 of X-cut lithium niobate, the diffused optical waveguides being formed by titanium indiffusion for periods of 8 to 12 hours, at about 1040° C. to 1060° C., so as to produce waveguides of approximately 6 $\mu$m width. A silicon buffer layer was formed on the substrate, on which the electrodes 18,19,20, 22,23 and 24 were then formed by conventional electrode photolithography, deposition and plating steps. The formed electrodes had a final thickness of about 8 $\mu$m.

Each arm 13 and 14 of the optical waveguide had a length of about 22 mm, and each modulator section 17 and 21 had a length of 10 mm. Tests showed that complete switching of an optical signal could be obtained with 8V applied on either modulator section; duo-binary modulation could thus be achieved by driving both sections each with 4V signals.

Figure 4:
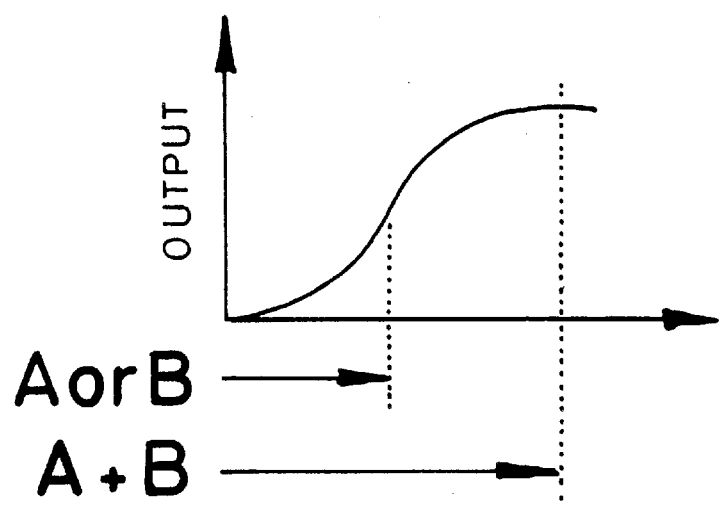

FIGS. 3 and 4 illustrate the use of the modulator described above, for duobinary modulation. FIG. 3 essentially corresponds to FIG. 1, though here the two modulator sections are identified by the letters A and B. The following data table shows the ternary output from the modulator with different binary signals applied to the modulator sections A and B.

| Input A | Input B | Ternary Output |
|---------|---------|----------------|
| 0 | 0 | 0 |
| V | 0 | 1 |
| 0 | V | 1 |
| V | V | 2 |

As can be seen, the output is ternary, in that it has levels of 0, 1 and 2, respectively obtained by applying 0-level binary signals on both modulator sections, 0-level on one section and 1-level (i.e. full driving voltage V) on the other section, and 1-level (i.e. full driving voltage V) on both sections. This is diagrammatically illustrated in FIG. 4.

FIG. 5 shows a duobinary modulator system, using the principles described above. Here, an optical carrier wave of an appropriate frequency is generated by laser 30, fed by an optical fibre 31 to a modulator 32 of a construction as described with reference to FIG. 1. The modulator supplies a duobinary modulated optical signal to a transmission fibre 33.

Data to be transmitted along fibre 33 is supplied at 34 to an interface circuit 35, which drives the two electrodes of the two modulator sections respectively, of the modulator 32. Also shown at FIG. 5A is the input data eye diagram for data supplied to the input of the interface circuit 35, and the output eye diagram (FIG. 5B) consequent upon the modulation of the carrier wave. As can be seen, the output signal is of ternary (i.e. three-level) form. The data table for this modulation is set out below.

| A | B | Output Data |
|---|---|-------------|
| 0 | 0 | 0 |
| 1 | 0 | 1 |
| 0 | 1 | 1 |
| 1 | 1 | 2 |

We claim:

1. An integrated optical modulator for producing a duobinary modulated optical signal from binary drive signals, comprising:

a substrate in which is formed an optical waveguide, said waveguide having an input section, two arms into which said input section divides, and an output waveguide into which said arms merge whereby incoming light directed into said input section divides to be propagated along both arms and on being recombined at said output waveguide interference may occur, in which modulator said arms are sufficiently separated for there to be no significant power coupling therebetween;

a first modulator electrode structure arranged with respect to said two arms over a first part thereof; and a second modulator electrode structure substantially similar to said first modulator electrode structure, said second modulator electrode structure being arranged with respect to said two arms over a second part thereof, the first and second modulator electrode structures being arranged serially along the arms and having substantially the same optical path length, each electrode structure having separately addressable electrodes each by appropriate binary drive signals;

duobinary signal driver means for producing a duobinary modulated optical signal from the binary drive signals.

2. An integrated optical modulator as claimed in claim 1, wherein each of the first and second modulator electrode structures is arranged as a part of a Mach-Zehnder interferometer;

said duobinary signal driver means drives said first and second modular electrode structures in a specific manner to produce said duobinary modulated optical signals;

said first and second modulator electrode structures include dual electrode gaps.

3. An integrated optical modulator as claimed in claim 1, wherein the first modulator electrode structure is substantially co-planar with the second modulator electrode structure.

4. An integrated optical modulator as claimed in claim 1, wherein both the first and the second modulator electrode structures are arranged as amplitude modulators.

5. An integrated optical modulator as claimed in claim 1, wherein both of the first and second modulator electrode structures are arranged as phase modulators.

6. An integrated optical modulator system for producing a duobinary modulated optical signal from binary drive signals, comprising:

a substrate in which is formed an optical waveguide, said waveguide having an input section, two arms into which said input section divides, and an output waveguide into which said arms merge whereby incoming light directed into said input section divides to be propagated along both arms and on being recombined at said output waveguide interference may occur, in which modulator said arms are sufficiently separated for there to be no significant power coupling therebetween, the modulator having a first modulator electrode structure arranged with respect to said two arms over a first part thereof, and a second modulator electrode structure substantially similar to said first modulator electrode structure, said second modulator electrode structure being arranged with respect to said two arms over a second part thereof, the first and second modulator electrode structures being arranged serially along the arms and having substantially the same optical path length, each electrode structure having separately addressable electrodes each by appropriate binary drive signals, first and second binary drive circuits arranged to supply binary drive signals separately to the first and second modulator electrode structures, respectively, said signals driving the respective electrodes being of the same polarity.

7. A modulating method to produce a duobinary modulated optical signal using an integrated optical modulator, which said modulator has a substrate in which is formed an optical waveguide having an input section, two arms into which the input section divides which arms are sufficiently separated for there to be no significant optical power coupling therebetween, and an output waveguide into which the two arms merge, the modulator having first and second separate and substantially similar modulator electrode structures arranged serially with respect to the two arms and having separately addressable electrodes, in which method:

an optical wave is fed into the input section of said waveguide;

the optical wave is divided into two portions which propagate respectively along the two arms and are then recombined into the output waveguide; and supplying separate binary drive signals to the two electrode structures respectively to produce a duobinary modulated optical signal.

8. A modulating method as claimed in claim 7, wherein each of the first and second modulator electrode structures produce one of phase modulation and amplitude modulation of the optical wave propagating through said arms.

9. A modulating method as claimed in claim 7, wherein said binary drive signals supplied to the respective electrode structures are of the same polarity.

10. A method of modulating an optical signal, the method comprising the steps of:

providing a substrate including an input optical waveguide with an input section dividing into two arms and an output waveguide into which said arms merge;

providing a first modulator electrode structure arranged over a first part of said arms;

providing a second modulator electrode structure arranged serially with said first modulator over a second part of said arms;

feeding the optical signal into said input optical waveguide;

receiving binary drive signals for modulating the optical signal;

driving said first and second modulators to produce a duobinary modulated optical signal on said output waveguide based on said binary drive signals.

* * * * *